US009685169B2

(12) United States Patent
Sorin

(10) Patent No.: US 9,685,169 B2
(45) Date of Patent: Jun. 20, 2017

(54) COHERENT PITCH AND INTENSITY MODIFICATION OF SPEECH SIGNALS

(71) Applicant: International Business Machines Corporation, Armonk, NY (US)

(72) Inventor: Alexander Sorin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 14/686,797

(22) Filed: Apr. 15, 2015

(65) Prior Publication Data
US 2016/0307560 A1    Oct. 20, 2016

(51) Int. Cl.
*G10L 21/003* (2013.01)
*G10L 21/01* (2013.01)
*G10L 21/013* (2013.01)

(52) U.S. Cl.
CPC ............ *G10L 21/003* (2013.01); *G10L 21/01* (2013.01); *G10L 2021/0135* (2013.01)

(58) Field of Classification Search
CPC .............. G10L 13/0335; G10L 21/013; G10L 2021/0135; G10L 21/003; G10L 21/01
See application file for complete search history.

(56) References Cited

U.S. PATENT DOCUMENTS

| 5,479,564 A | 12/1995 | Vogten et al. |
| 6,101,470 A * | 8/2000 | Eide ................ G10L 13/10 704/260 |
| 6,260,016 B1 * | 7/2001 | Holm ................ G10L 13/10 704/200 |
| 8,145,491 B2 | 3/2012 | Hamza et al. |
| 8,494,856 B2 | 7/2013 | Latorre et al. |
| 8,744,854 B1 * | 6/2014 | Chen ................ G10L 13/08 704/269 |

(Continued)

FOREIGN PATENT DOCUMENTS

EP    07003891.4    6/2007

OTHER PUBLICATIONS

R. Muralishankar et al., "Modification of Pitch using DCT in the Source Domain", Speech Communication, vol. 42, Issue 2, Feb. 2004, pp. 143-154.

(Continued)

*Primary Examiner* — Tammy Paige Goddard
*Assistant Examiner* — Walter Yehl

(57) ABSTRACT

A method comprising: receiving an utterance, an original pitch contour of the utterance, and a target pitch contour for the utterance, wherein the utterance comprises a plurality of consecutive frames, and wherein at least one of said frames is a voiced frame; calculating an original intensity contour of said utterance; generating a pitch modified utterance based on the target pitch contour; calculating an intensity modification factor for each of said frames, based on said original pitch contour and on said target pitch contour, to produce a sequence of intensity modification factors corresponding to said plurality of consecutive frames; calculating a final intensity contour for said utterance by applying said intensity modification factors to said original intensity contour; and generating a coherently modified speech signal by time dependent scaling of the intensity of said pitch modified utterance according to said final intensity contour.

16 Claims, 4 Drawing Sheets

(56) References Cited

U.S. PATENT DOCUMENTS

| | | | |
|---|---|---|---|
| 2004/0024600 A1* | 2/2004 | Hamza | G10L 13/07 704/268 |
| 2004/0030546 A1* | 2/2004 | Sato | G10L 13/08 704/207 |
| 2005/0131680 A1* | 6/2005 | Chazan | G10L 19/02 704/205 |
| 2006/0074678 A1 | 4/2006 | Pearson et al. | |
| 2008/0082333 A1* | 4/2008 | Nurminen | G10L 21/00 704/250 |
| 2011/0251840 A1* | 10/2011 | Cook | G10H 1/366 704/207 |
| 2013/0262119 A1* | 10/2013 | Latorre-Martinez | G10L 13/08 704/260 |
| 2014/0195242 A1* | 7/2014 | Chen | G10L 13/0335 704/260 |

OTHER PUBLICATIONS

Wen-Wei Liao and Jia-Lin Shen., "Improved Prosody Module in a Text-to-Speech System", The Association for Computational Linguistics and Chinese Language Processing (ACLCLP), Proceedings of the 16th Conference on Computational Linguistics and Speech Processing, Sep. 2004, pp. 345-354.
E. Moulines, W. Verhelst, "Time-domain and frequency-domain techniques for prosodic modification of speech", in Speech Coding and Synthesis, B. Klein ed, Elsevier Science Publishers 1995.

* cited by examiner

COHERENT PITCH AND INTENSITY MODIFICATION OF SPEECH SIGNALS

BACKGROUND

The present invention relates to the fields of speech synthesis and speech processing.

Pitch modification is an important processing component of expressive Text-To-Speech (TTS) synthesis and voice transformation. The pitch modification task may generally appear either in the context of TTS synthesis or in the context of natural speech processing, e.g. for entertainment applications, voice disguisement applications, etc.

Applications such as affective Human Computer Interface (HCI), emotional conversational agents and entertainment, demand for extreme pitch modification capability which preserves speech naturalness. However, it is widely acknowledged that pitch modification and synthesized speech naturalness are contradictory requirements.

Pitch modification may be performed, for example, over a non-parameterized speech waveform using Pitch-Synchronous Overlap and Add (PSOLA) method or by using a parametric speech representation. Regardless of the method used, significant raising or lowering of the original tone of speech segments may significantly deteriorate the perceived naturalness of the modified speech signal.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising: receiving an utterance, an original pitch contour of the utterance, and a target pitch contour for the utterance, wherein the utterance comprises a plurality of consecutive frames, and wherein at least one of said frames is a voiced frame; calculating an original intensity contour of said utterance; generating a pitch-modified utterance based on the target pitch contour; calculating an intensity modification factor for each of said frames, based on said original pitch contour and on said target pitch contour, to produce a sequence of intensity modification factors corresponding to said plurality of consecutive frames; calculating a final intensity contour for said utterance by applying said intensity modification factors to said original intensity contour; and generating a coherently-modified speech signal by time-dependent scaling of the intensity of said pitch-modified utterance according to said final intensity contour.

There is provided, in accordance with another embodiment, a computer program product comprising a non-transitory computer-readable storage medium having program code embodied therewith, the program code executable by at least one hardware processor to: receive an utterance, an original pitch contour of the utterance, and a target pitch contour for the utterance, wherein the utterance comprises a plurality of consecutive frames, and wherein at least one of said frames is a voiced frame; calculate an original intensity contour of said utterance; generate a pitch-modified utterance based on the target pitch contour; calculate an intensity modification factor for each of said frames, based on said original pitch contour and on said target pitch contour, to produce a sequence of intensity modification factors corresponding to said plurality of said consecutive frames; calculate a final intensity contour for said utterance by applying said intensity modification factors to said original intensity contour; and generate a coherently-modified speech signal by time-dependent scaling of the intensity of said pitch-modified utterance according to said final intensity contour.

There is provided, in accordance with a further embodiment, a system comprising: (i) a non-transitory storage device having stored thereon instructions for: receiving an utterance, an original pitch contour of the utterance, and a target pitch contour for the utterance, wherein the utterance comprises a plurality of consecutive frames, and wherein at least one of said frames is a voiced frame, calculating the original intensity contour of said utterance, generating a pitch-modified utterance based on the target pitch contour, calculating an intensity modification factor for each of said frames, based on said original pitch contour and on said target pitch contour, to produce a sequence of intensity modification factors corresponding to said plurality of said consecutive frames, calculating a final intensity contour for said utterance by applying said intensity modification factors to said original intensity contour, and generating a coherently-modified speech signal by time-dependent scaling of the intensity of said pitch-modified utterance according to said final intensity contour; and (ii) at least one hardware processor configured to execute said instructions.

In some embodiments, the received utterance is natural speech, and the method further comprises mapping each of said frames to a corresponding speech class selected from a predefined set of speech classes.

In some embodiments, the calculating of the intensity modification factor for each of said frames is based on a pitch-to-intensity transformation modeling the relationship between the instantaneous pitch frequency and the instantaneous intensity of the utterance, and the pitch-to-intensity transformation is represented as a function of a pitch frequency and a set of control parameters.

In some embodiments, each of said frames is mapped to a corresponding speech class selected from a predefined set of speech classes, and the method further comprises setting the values of said control parameters for each of said frames according to its corresponding speech class.

In some embodiments, the method of further comprises offline modeling of the pitch to intensity relationship to receive said values for said control parameters according to said speech classes.

In some embodiments, the method further comprises setting said control parameters to constant predefined values.

In some embodiments, the pitch-to-intensity transformation is based on log-linear regression, and the set of control parameters comprises the slope coefficient of the regression line of the log-linear regression.

In some embodiments, the intensity modification factor is ten in the power of the twentieth of the ratio of average empirical decibels per octave multiplied by the extent of pitch modification expressed in octaves.

In some embodiments, the value of the ratio of empirical decibels per octave is set to six decibels per octave.

In some embodiments, the calculating of the intensity modification factor for each of said frames comprises: calculating a reference value of the intensity corresponding to an original pitch frequency of the original pitch contour for said each frame, by applying the pitch-to-intensity transformation to the original pitch frequency; calculating a reference value of the intensity corresponding to the target pitch frequency of the target pitch contour for each of said frames by applying the pitch-to-intensity transformation to the target pitch frequency; and dividing the reference value of the intensity corresponding to the target pitch frequency by the reference value of the intensity corresponding to the original pitch frequency.

In some embodiments, the received utterance is natural speech, and the program code is further executable by said at least one hardware processor to map each of said frames to a corresponding speech class selected from a predefined set of speech classes.

In some embodiments, each of said frames is mapped to a corresponding speech class selected from a predefined set of speech classes, and the program code is further executable by said at least one hardware processor to set the values of said control parameters for each of said frames according to its corresponding speech class.

In some embodiments, the program code is further executable by said at least one hardware processor to offline model the pitch to intensity relationship to receive said values for said control parameters according to said speech classes.

In some embodiments, the system further comprises a database, wherein: each of said frames is mapped to a corresponding speech class selected from a predefined set of speech classes, the calculating of the intensity modification factor for each of said frames is based on a pitch-to-intensity transformation represented as a function of a pitch frequency and a set of control parameters, and the database comprises values of said control parameters per a speech class of said set of speech classes, and wherein said storage device have further stored thereon instructions for setting values for said control parameters for each of said frames according to its corresponding speech class, wherein the values are fetched from said database.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a coherent modification of pitch contour and intensity contour of a speech signal. The disclosed pitch contour and intensity contour modification may enhance pitch-modified speech signals by improving their naturalness. The disclosed enhancement may be applicable to virtually any type of pitch modification technique.

Some prior works, unrelated to pitch modification, reported experimental evidence of a salient positive correlation between instantaneous fundamental frequency and instantaneous loudness of speech. For example, in P. Gramming, et al, "Relationship between changes in voice pitch and loudness", Journal of Voice, Vol 2, Issues 2, 1988, pp. 118-126, Elsevier, 1988, that correlation phenomenon was observed in professional singers, healthy non-singers and people suffering from voice disorders. In Rosenberg, and J. Hirshberg, "On the correlation between energy and pitch accent in read English speech", In Proc. Interspeech 2006, Pittsburgh, Pa., USA, September 2006, a method was proposed for pitch accent prediction based on the pitch-energy correlation.

Figure 1:
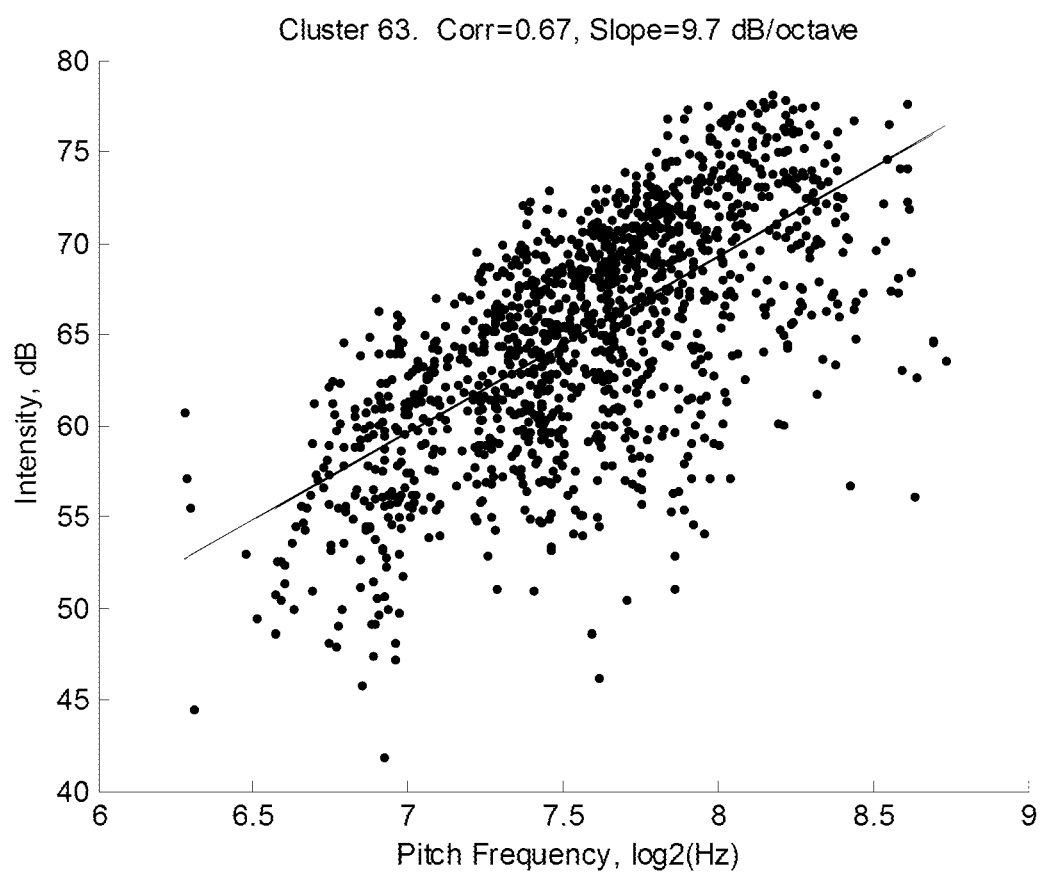
FIG. 1 shows a linear regression graph which shows the correlation between pitch frequency and intensity within an acoustic cluster derived from a TTS voice dataset.

Advantageously, the disclosed pitch contour and intensity contour modification may harness that correlation phenomenon to improve the sound naturalness of a speech signal otherwise damaged by pitch modification. A statistically-proven observation of a positive correlation between instantaneous pitch frequency and instantaneous intensity (also "loudness") of a speech signal is herein provided, which is the product of experimentation performed by the inventors. A statistical exemplification of this pitch-intensity relation is shown in FIG. 1.

The disclosed pitch contour and intensity contour modification formulates this proven pitch-intensity interrelation and manipulates it to improve the sound naturalness of a pitch-modified speech signal. More specifically, the intensity of a speech segment (represented, for example, as a frame of the speech signal) may be modified in agreement with the pitch modification within the segment. Such coherent modification of the pitch and intensity may significantly reduce the naturalness loss following pitch modification.

The term "utterance", as referred to herein, may relate to non-synthesized utterance (i.e., natural speech produced by a living being such as humans) and/or synthesized utterance (i.e., artificially-produced speech, e.g., as a result of TTS synthesis).

The utterance may be represented as a digitized speech signal (hereinafter also referred to as 'raw speech signal' or simply 'speech signal') and/or as a parameterized signal, as discussed below.

The speech signal may be mathematically represented as a function $s(n)$ of discrete time instant $n=0, 1, 2, \ldots, N$ corresponding to time moments $t_n = n \cdot \tau$, $n=0, 1, 2, \ldots, N$ where $\tau$ is the time sampling interval, e.g. $\tau = 1/22050$ seconds (s) for a 22050 Hertz (Hz) sampling rate.

For the purpose of speech processing, the time axis may be divided to frames centered at equidistant time offsets $k \cdot \Delta$, where $k=0, 1, 2, \ldots, K$ is the frame index and $\Delta$ is frame size. For example, frame size $\Delta=5$ milliseconds (ms) may be used for speech signals sampled at 22050 Hz.

Hereinafter various features of the speech signal calculated at frame level may be considered, such as pitch frequency (or simply 'pitch'), intensity, line spectrum and spectral envelope. The calculation at frame level may mean that a feature for frame k is derived from a portion of the signal enclosed within a short time window, such as, for example, 5 ms, 10 ms or 20 ms, surrounding the frame center $t_k = k \cdot \Delta$. These frame level values may be also referred to as instantaneous values at the centers of the respective frames.

The frame centers may be expressed in discrete time instants $n_k$, $k=0, 1, \ldots, K$. To this end, the frame center moments $t_k = k \cdot \Delta$ expressed in seconds may be divided by the sampling interval $\tau$ and rounded to the nearest integer values. For example, if the frame size is 5 ms and the sampling rate is 22050 Hz, then the frame centers in discrete time instants are: $n_0=0$, $n_1=110$, $n_2=220$, $n_3=330$ etc.

The term "pitch contour", as referred to herein, may relate to the sequence of fundamental frequency (or pitch frequency) values associated with the respective frame centers and may be denoted: $\{F0_k, k=0, 1, \ldots, K\}$. The value $F0_k=F0(n_k)$ may represent the instantaneous tone level of speech at the time moment $k \cdot \Delta$. The pitch frequency may be set to zero for unvoiced frames, i.e. frames which represent aperiodic parts of the utterance where pitch is undefined.

Speech signal intensity may be a measure of the loudness. The instantaneous intensity may be estimated as the square root of the signal energy. The signal energy may be measured as the sum of squared values of the signal components within a short window surrounding the time moment of interest. Equivalently, the signal energy may be measured as the sum of the squared magnitudes of the Short-Time Fourier Transform (STFT) of the signal. The sequence $\{I(n_k), k=0, 1, \ldots, K\}$ of the instantaneous intensity values associated with the frame centers may form what is referred to herein as the "intensity contour".

As an alternative to representing the utterance as a speech signal, it may be represented parametrically as a sequence $\{P_k, k=0, 1, \ldots, K\}$ of frame-wise sets of vocoder parameters, wherein a set $P_k$ may be associated with the center $n_k$ of k-th frame, $P_k=P(n_k)$. A speech signal corresponding to the utterance may be then reconstructed from the parametric representation (i.e., the parameterized signal):

$$\Omega: \{P(n_k), k=0,1,\ldots,K\} \Rightarrow \{s(n), n=0,1,\ldots,N\}$$

The contents of the vocoder parameter set $P_k$ and the reconstruction algorithm $\Omega$ may depend on the type of the parameterization (i.e., the vocoding technique) employed. The vocoder parameter set may include spectral envelop and excitation components or Sinusoidal Model parameters including harmonic and noise components. The pitch frequency is generally included in the vocoder parameter set.

Frames of the speech signal may be mapped to distinct speech classes. The frame class identity labels may be hereinafter referred to as frame classification information. A speech class may correspond to frames which represent certain phonetic-linguistic context. For example, the frame may belong to a certain phonetic unit which is a part of a sentence subject and is preceded by a consonant and followed by a vowel. Frames associated with the same class may be expected to have similar acoustic properties. It is known that speech manipulation techniques using class dependent transformations of frames may perform better than the ones employing global class independent transformations.

Evaluation of Statistical Evidence and Modeling of the Pitch-Intensity Relationship The pitch-intensity relationship may be analyzed per speech class using a TTS voice dataset built by techniques known in the art. The analysis presented below was performed using a TTS voice dataset built from expressive sports news sentences uttered by a female American English speaker and recorded at a 22050 Hz sampling rate.

As a starting phase of the voice dataset building procedure, the speech signals were analyzed at the frame update rate of 5 ms (i.e., frame size=5 ms). The analysis included pitch contour estimation using an algorithm similar to the one disclosed in A. Sorin et al., "The ETSI Extended Distributed Speech Recognition (DSR) standards: client side processing and tonal language recognition evaluation", In Proc. ICASSP 2004, Montreal, Quebec, Canada, May 2004. The analysis also included estimation of pitch harmonic magnitudes, also known as line spectrum, using the method presented in D. Chazan et al, "High quality sinusoidal modeling of wideband speech for the purpose of speech synthesis and modification", In Proc. ICASSP 2006, Toulouse, France, May 2006. The line spectrum estimation for each frame was performed using the 2.5 pitch period long hamming windowing function centered at the frame center. Then Mel-frequency Regularized Cepstral Coefficients (MRCC) spectral envelope parameters vector (see S. Shechtman and A. Sorin, "Sinusoidal model parameterization for Hidden Markov Model (HMM)-based TTS system", in Proc. Interspeech 2010, Makuhari, Japan, September 2010) was calculated for each frame. It should be noted that the specific pitch and line spectrum estimators and the MRCC spectral parameters may be substituted by other estimators known in the art and spectral parameters, respectively.

The frames represented by the MRCC vectors were used in a standard HMM-based phonetic alignment and segmentation procedure with three HMM states per phoneme. Hence, each segment may represent one third of a phoneme. The speech classes generation and segment classification were performed using a standard binary decision tree approach depending on phonetic-linguistic context and the MRCC vectors homogeneity. This process yielded about 5000 speech classes.

Only fully-voiced segments, i.e. the ones comprised of all voiced frames (i.e., frames which represent periodic parts of the utterance), were used for the pitch-intensity relationship analysis. The classes containing less than 5 frames found in fully voiced segments were excluded from the analysis. This pruning procedure retained about 1900 classes containing in total more than 1.6 million frames which sums to more than 8000 seconds of purely voiced speech material.

The energy was estimated for each frame as:

$$E = \sum_{i=1}^{N_h} A_i^2 \qquad (1)$$

where $A_i$ is the magnitude of the i-th harmonic and $N_h$ is the number of harmonics in the full frequency band (up to the Nyquist frequency of 11025 Hz) for that frame excluding the direct current component, i.e. excluding the harmonic associated with zero frequency. It should be noted that the line spectrum estimation algorithm (see D. Chazan et al, id) yields the harmonic magnitudes scaled in such a way that:

$$E \approx \frac{1}{2T} \sum_{n=1}^{T} \tilde{s}^2(n) \qquad (2)$$

where $\tilde{s}(n)$, $n=1, 2, \ldots, T$ is a representative pitch cycle associated with the frame center, and T is the rounded pitch period in samples corresponding to the F0 value associated with the frame. Thus the energy given by (1) is proportional to the average per-sample energy calculated over the representative pitch cycle derived from the speech signal around the frame center. Estimation of the representative pitch cycle is addressed herein below. Another line spectrum estimator may be used, e.g., spectral peak picking. In such a case, the appropriate scaling factor may be introduced in (1) to reproduce the results of the current analysis.

The intensity I was calculated for each frame as the squared root of the energy:

$$I = \sqrt{E} \quad (3)$$

Thus a frame k may be represented by the intensity $I_k$ and the pitch frequency $F0_k$. Both the parameters may be mapped to a logarithmic scale aligned with the human perception of the loudness and tone changes measured in decibel (dB) and octave (oct) units respectively:

$$IdB_k = 20 \cdot \log_{10} I_k \quad (4)$$

$$F0oct_k = \log_2 F0_k \quad (5)$$

Reference is now made to FIG. 1, which shows a linear regression graph presenting the correlation between pitch frequency and intensity within a speech class derived from the TTS voice dataset. The frames associated with one of the speech classes are depicted as points on the (F0oct, IdB) plane. The distribution of the points in FIG. 1 illustrates a salient interdependency between the intensity and pitch frequency.

To quantify the degree of this interdependency, the correlation coefficients between $\{IdB_k\}$ and $\{F0oct_k\}$ sequences were calculated at class levels and over the voice dataset globally. For example, the correlation coefficient calculated within the class shown in FIG. 1 is 0.67. The averaging of the intra-class correlation coefficients weighted by the respective class frame counts yielded the value of 0.52. The correlation coefficient calculated over the whole set of more than 1.6 million frames, ignoring the class association, is 0.40.

The correlation measures obtained in the above evaluation may provide a statistical evidence of the pitch-intensity relationship. An analytical expression which models the pitch-intensity relationship utilizing log-linear regression is herein disclosed. Nevertheless, other mathematical representations may be utilized, such as piece-wise linear, piece-wise log-linear or exponential functions. With reference to FIG. 1, the solid line is the regression line. The pitch-intensity relationship may be then expressed within each class C as:

$$IdB_C = \lambda_{1C} \cdot F0oct_C + \lambda_{2C} \quad (6)$$

The least squares approximation yields the following values for the regression parameters $\lambda_{1C}$ and $\lambda_{2C}$:

$$\lambda_{1C} = \frac{\sum_{\forall k \in C} F0oct_k \cdot \sum_{\forall k \in C} IdB_k - N_C \sum_{\forall k \in C} F0oct_k \cdot IdB_k}{\left[\sum_{\forall k \in C} F0oct_k\right]^2 - N_C \sum_{\forall k \in C} F0oct_k^2} \quad (7)$$

$$\lambda_{2C} = \frac{\sum_{\forall k \in C} F0oct_k \cdot \sum_{\forall k \in C} F0oct_k \cdot IdB_k - \sum_{\forall k \in C} F0oct_k^2 \cdot \sum_{\forall k \in C} IdB_k}{\left[\sum_{\forall k \in C} F0oct_k\right]^2 - N_C \cdot \sum_{\forall k \in C} F0oct_k^2} \quad (8)$$

where $N_C$ is the number of frames associated with the class C.

The model given by equations (6), (7) and (8) may be used for prediction of the intensity of a frame from the pitch frequency associated with the frame. Additionally this model may be used for prediction of the frame intensity altering when the frame pitch frequency is modified by a given amount.

The slope coefficient $\lambda_{1C}$ given by (7) of the regression line (6) may indicate the average constant rate of intensity increase dependent on pitch increase. For example, for the class shown in FIG. 1, the slope coefficient is equal to 9.7 dB/octave. This means that for speech frames associated with the concerned class, the intensity increases by 9.7 dB when the fundamental frequency rises by the factor of two. As was expected, the slope value may vary between the classes. Averaging of the intra-class slope values weighted by the respective class counts yielded the average slope value of 4.5 dB/octave. The average slope calculated over the whole set of more than 1.6 million frames, ignoring the class association, is 6.0 dB/octave.

The same evaluation performed with another TTS voice dataset derived from neutral speech produced by another American English speaker yielded similar results: the weighted average of the intra-class correlation coefficients was 0.40 and the weighted average of the intra-class slope values was 4.6 dB/octave.

Coherent Modification of Pitch Contour and Intensity Contour

Figure 2A:
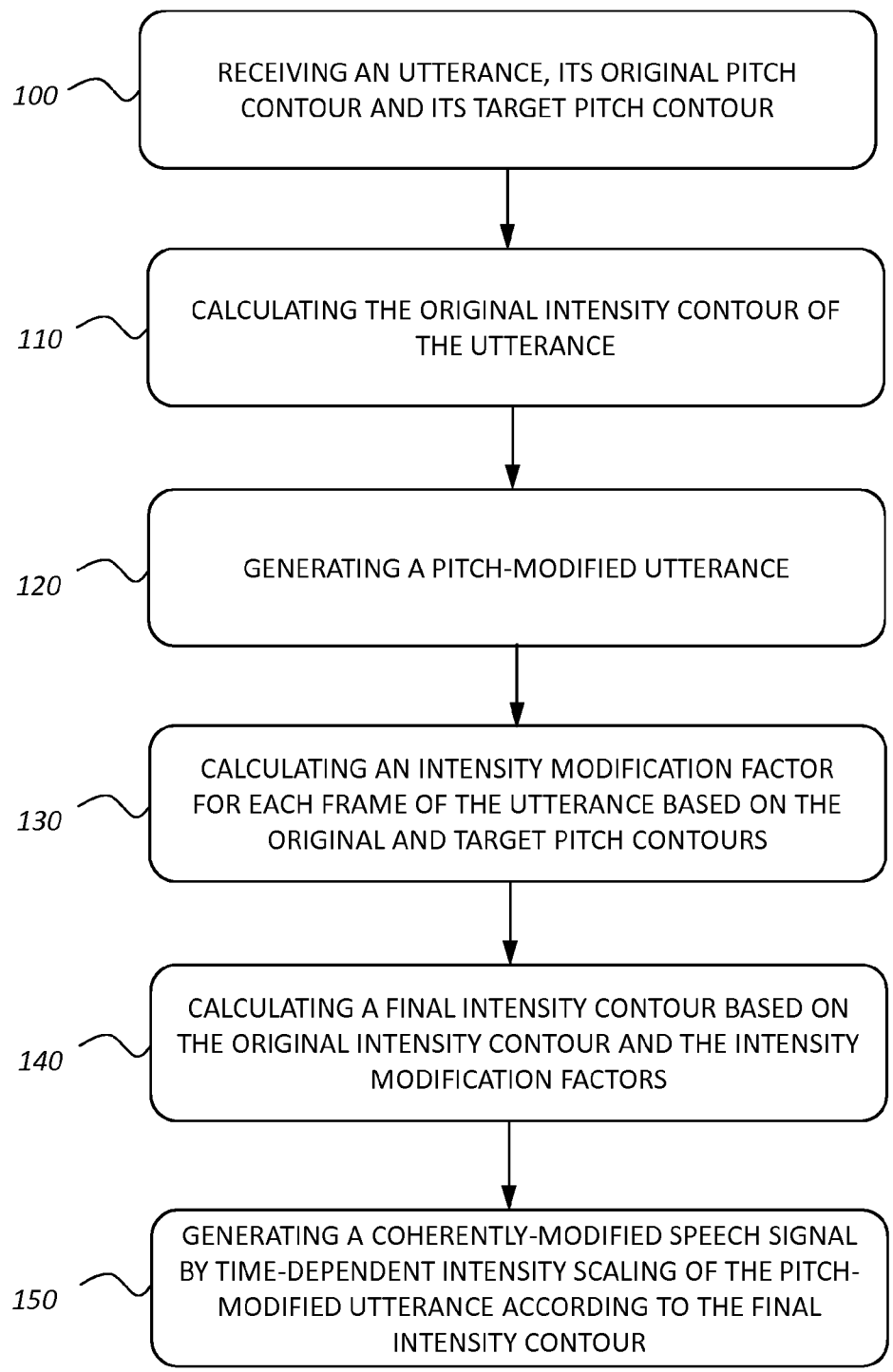
FIG. 2A shows a flowchart of a method, constructed and operative in accordance with an embodiment of the disclosed technique.
Figure 2B:
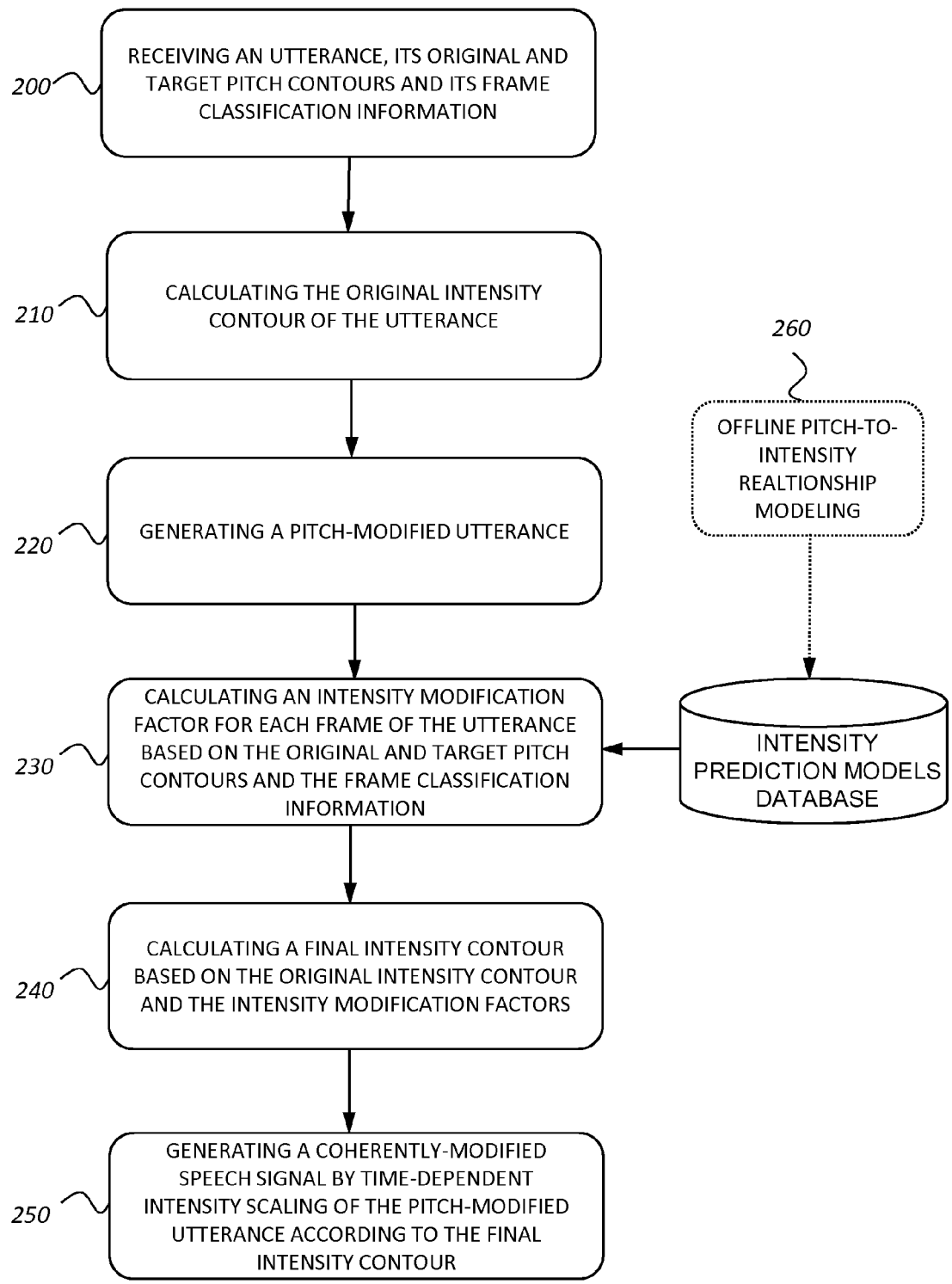
FIG. 2B shows a flowchart of an exemplary method, constructed and operative in accordance with another embodiment of the disclosed technique.

Reference is now made to FIGS. 2A and 2B. FIG. 2A shows a flowchart of a method, constructed and operative in accordance with an embodiment of the disclosed technique. FIG. 2B shows a flowchart of an exemplary method, constructed and operative in accordance with another embodiment of the disclosed technique. FIG. 2B shows a method which is exemplary to the general method of FIG. 2A. The method of FIG. 2B describes pitch contour and intensity contour modification based on frame classification information. In order to simplify the description, the general method steps are described herein for both methods, while indicating the differences between the two. Those of skill in the art will recognize that one or more of the steps of the methods of FIGS. 2A and/or 2B may be omitted, while still providing advantageous, coherent pitch and intensity modification. In addition, the method steps disclosed herein may be carried in an order different than as listed below.

In steps 100 and 200, an utterance, indicated $U_{org}$ (i.e., the original utterance), may be received (also referred as the original utterance, the received utterance or the received original utterance). The utterance may include a plurality of consecutive segments. Each segment may include one or more consecutive frames. Thus, the utterance may include a plurality of consecutive frames, while at least one of the frames is a voiced frame.

The utterance may be produced, for example, by a human speaker (i.e., natural speech) or by a TTS system (i.e., synthesized speech). The utterance may be represented by a raw speech signal $\{s_{org}(n), n=0, 1, \ldots N\}$ or by a sequence $\{P_k, k=0, 1, \ldots, K\}$ of frame-wise sets of vocoder parameters as described hereinabove.

Modern TTS systems may employ either concatenative (also known as unit selection) synthesis scheme or a statistical synthesis scheme or a mix of them. Regardless of the TTS scheme, the synthesized utterance may be composed of segments. A segment may include one or more consecutive speech frames. In the concatenative TTS, the segments (represented either by raw data or parameterized) may be extracted from natural speech signals. In statistical TTS, the segment frames may be represented in a parametric form and the vocoder parameter sets may be generated from statistical models. A TTS system may include a voice dataset, which may include a repository of labeled speech segments or a set of statistical models or both.

The hierarchical dichotomies described above are summarized in Table 1 below.

TABLE 1

Application context of pitch modification

| | TTS | | |
| --- | --- | --- | --- |
| | Concatenative | Statistical | Natural speech |
| Parametric representation | X | X | X |
| Raw speech signal | X | Not applicable | X |

In some embodiments, each frame of the received original utterance may be mapped to a distinct speech class selected from a predefined set of speech classes. Thus, according to step 200, a sequence: $\{C_k, k=0, 1, \ldots, K\}$ of the frame class identity labels may be received along with the original utterance.

In the context of TTS, the frame classification information may be inherently available. A TTS voice dataset may include a collection of speech segments (raw, parameterized or represented by statistical models) clustered according to their phonetic-linguistic context. At synthesis time, the received utterance may be composed of segments selected based on their class labels. The frames included in a segment may be mapped to the class associated with the segment.

In embodiments relating to applications operating on natural speech, the frame classification information may be further generated according to the disclosed method. Each of the frames of the utterance may be mapped to a corresponding speech class selected from a predefined set of speech classes. Alternatively, such information may be received with the original utterance. For example, an Automatic Speech Recognition (ASR) process may be applied to the natural utterance. The ASR may provide a word transcript and phonetic identity of each speech frame. Natural Language Processing (NLP) techniques may be applied to the word transcript to extract required linguistic features such as part of speech, part of sentence, etc. Finally, the phonetic-linguistic features associated with each frame may be mapped to a certain predefined phonetic-linguistic context as it is done in TTS front-end blocks.

As part of steps 100 and/or 200, the original pitch contour and/or the target pitch contour of the received utterance may be also received. The original pitch contour (i.e., prior to modification of the received utterance) may include a sequence of original pitch frequency values, corresponding to the frames of the received utterance, and may be indicated as: $\{F0_{org}(n_k), k=0, 1, 2, \ldots, K\}$. The target pitch contour may include a sequence of target pitch frequency values, corresponding to the frames of the received utterance, and may be indicated as: $\{F0_{out}(n_k), k=0, 1, 2, \ldots, K\}$. Optionally, the original pitch contour and/or the target pitch contour may be measured or generated as part of the disclosed technique. The original pitch contour may be measured and the target pitch contour may be generated in various manners depending on whether the utterance was produced by a human speaker, a concatenative TTS system or by a statistical TTS system.

When natural speech is concerned, the original pitch contour may be measured from the speech signal corresponding to the original utterance by one of the pitch estimation algorithms known in the art, such as the one disclosed in A. Sorin et al. (2004), id. When concatenative TTS is concerned, a concatenation of the segmental pitch contours may be performed. When statistical TTS is concerned, the original pitch contour may be the trajectory of the F0 parameter. The trajectory may be generated from the statistical models trained on the speech dataset, which is used for the modeling of all the vocoder parameters in the system.

When natural speech and TTS are concerned, the target pitch contour may be generated by transforming the original pitch contour. For example: $F0_{out}(n_k) = avF0_{out} + \alpha \cdot [F0_{org}(n_k) - avF0_{org}]$, where $avF0_{org}$ and $avF0_{out}$ are the utterance level average values of the original and target pitch contours respectively and α is the parameter that controls the dynamics and hence influences the perceived expressiveness of the target pitch contour. The utterance level average $avF0_{out}$ may be set to a desired pre-defined value or made dependent on the average value of the original pitch contour, e.g. $avF0_{out} = \beta \cdot avF0_{org}$ where β is a control parameter. When TTS (concatenative and statistical) is concerned, the target pitch contour may be generated by a rule-based framework. Alternatively, it may be derived from a relevant, typically expressive and relatively small speech data corpus external to the voice dataset used for the synthesis. The desired pitch values may be generated initially at a lower temporal resolution than a frame, e.g. one value per phoneme, and then downsampled to the frame centers grid.

Alternatively, the utterance in its original form and the utterance with a modified pitch (i.e. pitch-modified utterance) may be received. The original pitch contour may be then measured based on the utterance in its original form and/or the target pitch contour may be measured based on the pitch-modified utterance.

In steps 110 and 210, an original intensity contour $\{I_{org}(n_k), k=0, 1, 2, \ldots, K\}$ of the utterance may be calculated. This calculation may be performed by applying an instantaneous intensity estimator to the original utterance.

The instantaneous intensity estimator may be defined to output a value I(n) proportional to the average amplitude of samples of a speech signal corresponding to an utterance within a short time window surrounding the discrete time instant n.

When the representation of the utterance is based on a Sinusoidal Model, an instantaneous intensity estimator operating in frequency domain may be defined as specified by equations (3) and (1). The harmonic magnitudes $A_i$ associated with the frame centered at the time instant n may be determined using the line spectrum estimation algorithm similar to the D. Chazan et al, id. If the line spectrum is determined by a Short Time Fourier Transform (STFT) peak picking algorithm, then the harmonic magnitudes may be divided by the DC (direct current) value of the spectrum of the windowing function used in the STFT.

In some embodiments, the intensity estimator may be defined to operate over a speech signal in time domain. In this case the intensity I(n) may be also calculated as the square root of the energy E(n) as specified in equation (3), but the energy may be estimated from the speech signal s using a time window surrounding the time instant n. The simplest form of the energy estimation may be given by:

$$E(n) = \frac{1}{L_n} \sum_{i=n-\lfloor(L_n-1)/2\rfloor}^{i=n-\lfloor(L_n-1)/2\rfloor+L_n-1} s^2(i) \qquad (9)$$

where $L_n$ is the window length (generally frame dependent) and $\lfloor . \rfloor$ denotes the down integer rounding operation. The value of $L_n$ may be set so that the window includes one pitch cycle:

$$L_n=T_n=\lfloor F_s/F0(n) \rfloor \qquad (10)$$

where $F_s$ is the sampling frequency, e.g. 22,050 Hz, and $\lfloor . \rfloor$ denotes the integer rounding operation. However, other settings may be possible. With these settings the expression (9) may represent the average energy of the pitch cycle centered at the time instant n.

A more robust method may be employed to extract a representative pitch cycle $\tilde{s}(i)$, $i=1, 2, \ldots, T_n$ as a weighted average of the pitch cycles occurring in proximity of the time instant n:

$$\tilde{s}(i) = \frac{\sum_{k \in K(i)} s(n - \lfloor T_n/2 \rfloor + i + kT_n) \cdot w(n - \lfloor T_n/2 \rfloor + i + kT_n)}{\sum_{k \in K(i)} w(n - \lfloor T_n/2 \rfloor + i + kT_n)} \qquad (11a)$$

where:
w(i), i=1, 2, . . . , 2M+1 is a positive windowing function symmetric relatively to i=M+1, e.g., Hamming windowing function; and
the interval K(i) spanned by the summation index k is defined so that:

$$|-\lfloor T_n/2 \rfloor + i + kT_n| \leq M.$$

Then the energy E(n) may be calculated as:

$$E(n) = \frac{1}{T_n} \sum_{i=1}^{T_n} \tilde{s}^2(i) \qquad (11b)$$

In steps 120 and 220, a pitch-modified utterance $U_{intr}$ (hereafter referred to as intermediate utterance) may be generated based on the target pitch contour. The pitch-modified utterance may be generated by applying a pitch modification technique to the original utterance $U_{org}$. Any pitch modification technique suitable for the original utterance representation form may be applied. Some pitch modification techniques depending on the underlying speech representation are exemplified below.

When raw speech signal is concerned, the pitch modification may be performed by using Pitch Synchronous Overlap and Add (PSOLA) techniques either in time or frequency domain (see E. Moulines, W. Verhelst, "Time-domain and frequency-domain techniques for prosodic modification of speech", in *Speech Coding and Synthesis*, B. Klein ed, Elsevier Science Publishers 1995). PSOLA may require calculation of pitch marks (i.e., pitch cycle related epochs) derived from the pitch contour and the signal.

When a parameterized signal is concerned, the pitch modification may be performed in the space of vocoder parameters yielding a parameterized pitch-modified signal. In some embodiments it may be preferable to further convert the parameterized pitch-modified (or intermediate) signal to the form of raw speech signal. The pitch modification algorithm may depend on the parametric representation adopted in the system.

Some of the statistical TTS systems may adopt the source-filter representation framework (see Zen, H., Tokuda, K., and Black, A. W., "Statistical parametric speech synthesis", *Speech Communication*, vol. 51, November 2009, pp. 1039-1064) where the source may represent the excitation signal produced by the vocal folds and the filter may represent the vocal tract. Within this framework the main (quasi-periodic) part of the excitation signal may be generated using the target pitch contour. Other vocoding techniques may employ frame-wise sinusoidal representations (see Chazan et al., id; S. Shechtman and A. Sorin, "*Sinusoidal model parameterization for HMM-based TTS system*", in *Proc. Interspeech* 2010, Makuhari, Japan, September 2010; T. F. Quatieri and R. I. McAulay, "Speech Transformations Based on a Sinusoidal Representation." *IEEE Trans. Acoust. Speech Signal Process*. ASSP-34, 1449, December 1986; Stylianou, Y., et al, "An extension of the adaptive Quasi-Harmonic Model", in *Proc. ICASSP* 2012, Kyoto Japan, March 2012). In such a framework, the pitch modification at frame k may be performed by an interpolation and re-sampling of the frame-wise harmonic structures (also known as line spectra) along the frequency axis at the integral multiples of the target pitch frequency $F0_{out}(k)$.

The intermediate utterance $U_{intr}$ may be represented either in a parametric form as a sequence $\{P_{intr}(n_k), k=0, 1, \ldots, K\}$ of modified sets of vocoder parameters or by a modified raw speech signal $s_{intr}(n)$, depending on the representation type of the received original utterance. Although other representations may be applicable, in embodiments based on Sinusoidal Model representation of the original utterance, the intermediate utterance may be kept in the parameterized form while otherwise, it may be represented by a raw speech signal.

In steps 130 and 230, an intensity modification factor $\rho(n_k)$ may be calculated for each frame based on the original pitch contour and the target pitch contour. More specifically, an intensity modification factor $\rho(n_k)$ may be calculated for each frame k based on the original pitch frequency value $F0_{org}(n_k)$ and the target pitch frequency value $F0_{out}(n_k)$ associated with that frame. If the frame is unvoiced then the intensity modification factor may be set such that: $\rho(n_k)=1$.

For a voiced frame the calculation of the intensity modification factor may be based on a pitch-to-intensity transformation R modeling the relationship between the instantaneous pitch frequency F0 and instantaneous intensity I. Such a transformation may be defined as:

$$I=R(F0,\lambda) \qquad (12)$$

where $\lambda$ is a set of control parameters. Thus, the transformation may be represented, for example, as a function of the pitch frequency and a set of control parameters.

The calculation of the intensity modification factor $\rho(n_k)$ for a voiced frame k may include setting values for the control parameters $\lambda$ of the pitch-to-intensity transformation R.

According to step 230, the calculation of the intensity modification factor may be further based on the frame classification information. The control parameters may be then set to a value $\lambda^*_{C_k}$ associated with the speech class $C_k$ corresponding to the frame. The value $\lambda^*_{C_k}$ for each speech class may be fetched from an Intensity Prediction Models Database. Such a database may be generated in an offline modeling step 260, as described herein below. If the class $C_k$ is marked at the offline modeling step as irrelevant for the intensity modification then the intensity modification factor may be directly set as $\rho(n_k)=1$ without setting the control parameter values $\lambda$.

With reference to both methods, i.e., the methods of FIGS. 2A and 2B, the control parameters may be set to a constant predefined value. The predefined value may be selected by using a subjective listening evaluation. Alternatively, the predefined value may be determined as the average value derived from an existing clustered collection of speech using an evaluation similar to the one presented in the section entitled "Evaluation of Statistical Evidence and Modeling of the Pitch-Intensity Relationship" hereinabove.

The calculation of the intensity modification factor may further include calculating a reference value of the intensity $I_{org}^{ref}(n_k)$ corresponding to the original pitch frequency applying the R-transformation of equation (12) to the original pitch frequency as follows:

$$I_{org}^{ref}(n_k)=R(F0_{org}(n_k),\lambda) \quad (13)$$

The calculation of the intensity modification factor may further include calculating a reference value of the intensity $I_{mod}^{ref}(n_k)$ corresponding to the modified (i.e., target) pitch frequency applying the R-transformation of equation (12) to the modified pitch frequency as follows:

$$I_{mod}^{ref}(n_k)=R(F0_{out}(n_k),\lambda) \quad (14)$$

The intensity modification factor $\rho(n_k)$ may be then obtained by dividing the reference value of the intensity $I_{mod}^{ref}(n_k)$ corresponding to the target (i.e., modified) pitch frequency by the reference value of the intensity $I_{org}^{ref}(n_k)$ corresponding to the original pitch frequency:

$$\rho(n_k)=I_{mod}^{ref}(n_k)/I_{org}^{ref}(n_k) \quad (15)$$

In some embodiments, the R-transformation (12) may be defined according to equations (4), (5) and (6), i.e., based on log-linear regression, as follows:

$$I = 10^{\frac{1}{20}(\lambda_1 log_2 F0 + \lambda_2)} \quad (16)$$

yielding the intensity modification factor in the form:

$$\rho(n_k) = 10^{\frac{1}{20}\lambda_1 [log_2 F0_{out}(n_k) - log_2 F0_{org}(n_k)]} \quad (17)$$

Hence, in such embodiments, the intensity modification factor depends only on the amount of pitch modification $F0_{out}/F0_{org}$ regardless of the absolute level of F0. With specific reference to the method of FIG. 2B, the value of the parameter $\lambda_1$ may be set to the value calculated in step 260 for the corresponding speech class. With specific reference to the method of FIG. 2A, the parameter may be set to the average $\lambda_1$ value of 6 dB/octave derived from an existing speech corpus. Thus, the intensity modification factor may be equal to ten in the power of the twentieth of an empiric average decibels per octave ratio of a speech signal (i.e., $\lambda_1$) multiplied by the extent of pitch modification expressed in octaves.

In some embodiments, other types of the R-transformation may be used, e.g. based on an exponential function, or piece-wise linear function in the linear or log scales.

In an optional step, temporal smoothing may be applied to the sequence $\{\rho(n_k), k=0, 1, 2, \ldots, K\}$ of the intensity modification factors. A smoothened sequence $\{\rho_s(n_k), k=0, 1, 2, \ldots, K\}$ of the intensity modification factors may be then generated. Such temporal smoothing may prevent abrupt changes in the final intensity contour.

Any smoothing technique, as known in the art, may be adopted. One choice may be the weighted moving averaging method, i.e. the convolution with a symmetric positive (2I+1)-tap filter v:

$$\rho_s(n_k) = \frac{\sum_{i=-I}^{i=I} v_i \cdot \rho(n_{k+i})}{\sum_{i=-I}^{i=I} v_i}; v_i > 0, v_i = v_{-i} \quad (18)$$

The filter v may be defined, for example, as: $[v_0=3, v_1=2, v_2=1]$. The smoothed sequence of the intensity modification factors may be used in the following steps instead of the original sequence of the intensity modification factors.

In steps 140 and 240, a final intensity contour $\{I_{out}(n_k), k=0, 1, 2, \ldots, K\}$ may be calculated. The calculation may be based on the original intensity contour and the sequence of the intensity modification factors.

The sequence of the intensity modification factor values (i.e., per frame) may be applied to the original intensity contour:

$$I_{out}(n_k)=I_{org}(n_k)\cdot\rho(n_k) \quad (19)$$

The values of the final intensity contour may be then limited in order to preserve the original amplitude range of the output speech signal and/or to prevent possible clipping of the output signal:

$$I_{out}(n_k)=\max(I_{out}(n_k),I_{max}) \quad (20)$$

where $I_{max}$ is either a predefined value or is derived from the original utterance, for example:

$$I_{max} = \max_{0 \leq k \leq K} I_{org}(n_k) \quad (21)$$

In steps 150 and 250, a coherently-modified speech signal (i.e., the output speech signal) may be generated by time-dependent intensity scaling of the intermediate (i.e. pitch-modified) utterance according to the final intensity contour.

The intensity scaling may include determining an intermediate intensity contour $\{I_{intr}(n_k), k=0, 1, 2, \ldots, K\}$ based on the pitch-modified utterance. The intermediate intensity contour may be determined by applying the instantaneous intensity estimator, described hereinabove, to the intermediate (i.e. pitch modified) utterance.

The intensity scaling may further include determining a gain factor contour $\{g(n_k), k=0, 1, 2, \ldots, K\}$ comprised of frame-wise gain factor values:

$$g(n_k) = \frac{I_{out}(n_k)}{I_{intr}(n_k)} \quad (22)$$

In embodiments employing Sinusoidal Model based speech representation, the intensity scaling may further include multiplying all the sinusoidal component magnitudes by $g(n_k)$ for each frame k of the pitch-modified utterance and then transforming of the modified parametric representation to the output speech signal $s_{out}(n)$.

Otherwise, the intensity scaling may further include deriving a gain factor signal $\{g(n), n=0, 1, 2, \ldots, N\}$ by down-sampling the gain factor contour $\{g(n_k), k=0, 1, 2, \ldots, K\}$ using an interpolation function h:

$$g(n)=h(n-n_k)\cdot g(n_k)+(1-h(n-n_k))\cdot g(n_{k+1}) \quad \text{for}$$
$$n_k \leq n \leq n_{k+1} 1=h(0)>h(1)>h(2)\ldots>h(n_{k+1}-n_k)=0 \quad (23)$$

The interpolation function $\{h(i), i=0, 1, \ldots, t_{k+1}-t_k\}$ may be set, for example, to the right half of hann windowing function.

The intensity scaling may further include multiplying the raw speech signal corresponding to the intermediate utterance (i.e. the pitch-modified speech signal or the intermediate speech signal) by the gain factor signal:

$$s_{out}(n) = s_{intr}(n) \cdot g(n) \quad (24)$$

With specific reference to FIG. 2B and in an optional step 260, an offline modeling of the pitch-intensity relationship may be performed to receive values for the control parameters according to speech classes. This step may follow the description provided in the section entitled "Evaluation of Statistical Evidence and Modeling of the Pitch-Intensity Relationship" hereinabove.

A collection of speech data may be required for this step. The collection of speech data may include speech segments mapped to the speech classes expected in the frame classification information. Each speech segment may be divided to frames. A frame may be mapped to the speech class associated with the segment including that frame. In the context of a TTS application, such a collection may be readily available as a part of the voice dataset. In the context of natural utterance processing, such a collection may be composed from a transcribed and phonetically aligned single speaker data corpus either publically available (e.g., TIMIT Acoustic-Phonetic Continuous Speech Corpus, *Linguistic Data Consortium*. University of Pennsylvania. Web. Mar. 1, 2015, https://catalog.ldc.upenn.edu/LDC93S1) or proprietary.

For each class C, all the voiced frames may be gathered. In order to make the estimation more robust, the voiced frames which are included in not fully-voiced segments (i.e., a segment containing at least one unvoiced frame) may be excluded. The following sub-steps may be performed for a class C, optionally provided that the number of frames gathered for this class is greater than a predefined amount, e.g., four.

Each analyzed frame k may be represented by the pitch frequency $F0_k$ value and the intensity $I_k$ value estimated by using the intensity estimator adopted for the specific case. Two observation vectors $I_C = \{I_k, \forall k \in C\}$ and $F0_C = \{F0_k, \forall k \in C\}$ may be generated by stacking together the frame intensity and pitch frequency values respectively. The optimal set of the parameter values $\lambda^*_C$ of the pitch-to-intensity transformation (12) may be determined such that the intensity values predicted by the equation (12) yields the best possible approximation of the real intensity values observed in the frames associated with class C:

$$\lambda^*_C = \underset{\lambda}{\operatorname{argmin}} \|W_I(I_C) - W_{F0}(R(F0_C, \lambda))\|^2 \quad (25)$$

where $W_I(x)$ and $W_{F0}(x)$ are intensity and pitch frequency scale mapping functions respectively. It should be noted that $W_I(X)$ and $W_{F0}(X)$ denote the component-wise transformations of the vector X; $R(X,\lambda)$ denote the component-wise transformation of the vector X. In some embodiments, where no scale mapping is performed, an identity scale mapping function may be used (e.g., $W_I(x)=x$). The optimization problem (25) may be solved by a suitable numeric optimization technique, as known in the art.

In some embodiments, the R-transformation may be defined by equation (16) and the scale mapping functions may be defined according to equations (4) and (5), as follows:

$$W_I(I) = IdB = 20 \cdot \log_{10} I \quad (26a)$$

$$W_{F0}(F0) = F0oct = \log_2 F0 \quad (26b)$$

In this case, the optimization problem of equation (25) may be solved analytically and the optimal parameter values for a class C may be calculated as specified by equations (7) and (8).

The per-class optimal control parameter values $\lambda^*_C$ labeled by the respective class identity may be stored in the intensity prediction models database which may be available at run-time.

Speech classes that do not include enough observation data for the statistically meaningful estimation of the parameters $\lambda$ (for example, those classes containing less than five frames found in fully voiced segments) may be marked in the intensity prediction models database as irrelevant for the intensity modification.

Step 260 may be performed offline and prior to the performance of steps 200-250 of the method of FIG. 2B.

Figure 3:
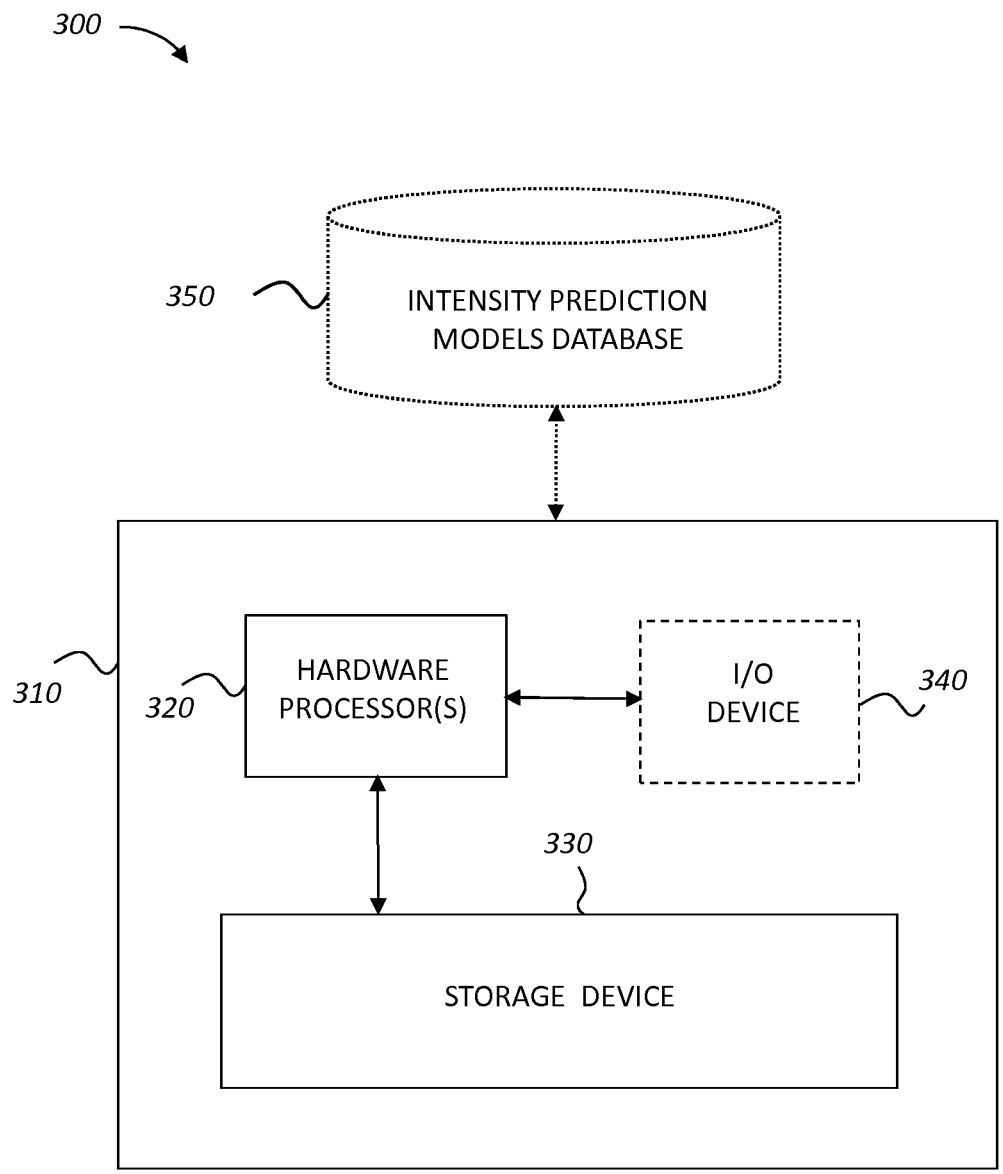
FIG. 3 shows an exemplary system according to an embodiment.

Reference is now made to FIG. 3, which shows an exemplary system 300, according to an embodiment. System 300 may include a computing device 310. Computing device 310 may include a hardware processor 320 and a storage device 330. System 300 may further include an input/output ("I/O") device 340 and/or an intensity prediction models database 350 (or simply 'database 350'). Hardware processor 320 may include one or more hardware processors, storage device 330 may include one or more storage devices, I/O device 340 may include one or more I/O devices and database 350 may include one or more databases. Hardware processor 320 may be configured to execute the methods of FIGS. 2A and/or 2B and, to this end, be in communication with database 350 and receive data therefrom. Database 350 may include values of control parameters per a speech class which may be used for generating a coherently modified speech signal according to the method of FIG. 2B. I/O device 340 may be configured to allow a user to interact with system 300. For example, I/O device 340 may include, inter alia, a microphone to allow a user to record and thus provide an utterance to computing device 310. The utterance may be then stored in storage device 330 and processed by hardware processor 320 according to the methods of FIGS. 2A and/or 2B. Dedicated software, implementing the methods of FIGS. 2A and/or 2B discussed above, may be stored on storage device 330 and executed by hardware processor 320.

Database 350 may be stored on any one or more storage devices such as a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. Database 350 may be a relational database, a hierarchical database, object-oriented database, document-oriented database, or any other database.

In some embodiments, computing device 310 may include an I/O device 340 such as a terminal, a display, a keyboard, a mouse, a touch screen, a microphone, an input device and/or the like, to interact with system 300, to invoke system 300 and to receive results. It will however be appreciated that system 300 may operate without human operation and without I/O device 340.

In some exemplary embodiments of the disclosed subject matter, storage device 330 may include or be loaded with code for a user interface. The user interface may be utilized to receive input or provide output to and from system 300, for example receiving specific user commands or parameters related to system 300, providing output, or the like.

Experimental Results

A standard subjective listening preference test was performed in order to test the disclosed speech modification. Twelve text messages conveying expressive contents (Sports News) were synthesized by a TTS system trained on a neutral voice. During the synthesis, expressive pitch contours where implanted into the speech signals, i.e. the default pitch contours emerging from the TTS system were replaced by externally generated expressive ones. The synthesis has been performed twice: A) while preserving the original energy contour; and B) while modifying the energy contour in accordance with the disclosed technique. Ten listeners were presented with 12 pairs of stimuli each. Each pair included the above version A and version B of the same stimulus. After listening to both versions of a stimulus, a listener was instructed to choose between five options: no preference, preference to either version, strong preference to either version. The evaluation revealed average preference of 51% including 14% of strong preference for the version B, i.e., the speech signal modified according to the disclosed technique, and only 25% for the version A.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   operating one or more hardware processors for receiving an utterance embodied as digitized speech signal, an original pitch contour of the utterance, and a target pitch contour for the utterance, wherein the utterance comprises a plurality of consecutive frames, and wherein at least one of said frames is a voiced frame;
   operating at least one of said one or more hardware processors for calculating an original intensity contour of said utterance;
   operating at least one of said one or more hardware processors for generating a pitch-modified utterance based on the target pitch contour;
   operating at least one of said one or more hardware processors for calculating an intensity modification factor for each of said frames, based on said original pitch contour and on said target pitch contour, to produce a sequence of intensity modification factors corresponding to said plurality of consecutive frames, wherein:
      the calculating of the intensity modification factor for each of said frames is further based on a pitch-to-intensity transformation modeling the relationship between the instantaneous pitch frequency and the instantaneous intensity of the utterance,
      the pitch-to-intensity transformation is represented as a function of a pitch frequency and a set of control parameters, and
      the pitch-to-intensity transformation is based on log-linear regression, and wherein the set of control parameters comprises the slope coefficient of the regression line of the log-linear regression;
   operating at least one of said one or more hardware processors for calculating a final intensity contour for said utterance by applying said intensity modification factors to said original intensity contour; and
   operating at least one of said one or more hardware processors for generating a coherently-modified speech signal by time-dependent scaling of the intensity of said pitch-modified utterance according to said final intensity contour.

2. The method of claim 1, wherein the received utterance is natural speech, and wherein the method further comprises mapping each of said frames to a corresponding speech class selected from a predefined set of speech classes.

3. The method of claim 1, wherein each of said frames is mapped to a corresponding speech class selected from a predefined set of speech classes, and wherein the method further comprising setting the values of said control parameters for each of said frames according to its corresponding speech class.

4. The method of claim 3, further comprising operating at least one of said one or more hardware processors for offline modeling of the pitch to intensity relationship to receive said values for said control parameters according to said speech classes.

5. The method of claim 1, further comprising operating at least one of said one or more hardware processors for setting said control parameters to constant predefined values.

6. The method of claim 1, wherein the intensity modification factor is ten in the power of the twentieth of the ratio of average empirical decibels per octave multiplied by the extent of pitch modification expressed in octaves.

7. The method of claim 6, wherein the value of the ratio of empirical decibels per octave is set to six decibels per octave.

8. The method of claim 1, wherein the calculating of the intensity modification factor for each of said frames comprises:
   calculating a reference value of the intensity corresponding to an original pitch frequency of the original pitch contour for said each frame, by applying the pitch-to-intensity transformation to the original pitch frequency;
   calculating a reference value of the intensity corresponding to the target pitch frequency of the target pitch contour for each of said frames by applying the pitch-to-intensity transformation to the target pitch frequency; and
   dividing the reference value of the intensity corresponding to the target pitch frequency by the reference value of the intensity corresponding to the original pitch frequency.

9. A computer program product comprising a non-transitory computer-readable storage medium having program code embodied therewith, the program code executable by at least one hardware processor to:
   receive an utterance embodied as digitized speech signal, an original pitch contour of the utterance, and a target pitch contour for the utterance, wherein the utterance comprises a plurality of consecutive frames, and wherein at least one of said frames is a voiced frame;
   calculate an original intensity contour of said utterance;
   generate a pitch-modified utterance based on the target pitch contour;
   calculate an intensity modification factor for each of said frames, based on said original pitch contour and on said target pitch contour, to produce a sequence of intensity modification factors corresponding to said plurality of said consecutive frames,
   wherein:
      the calculating of the intensity modification factor for each of said frames is further based on a pitch-to-intensity transformation modeling the relationship between the instantaneous pitch frequency and the instantaneous intensity of the utterance, the pitch-to-intensity transformation is represented as a function of a pitch frequency and a set of control parameters, and the pitch-to-intensity transformation is based on log-linear regression, and wherein the set of control parameters comprises the slope coefficient of the regression line of the log-linear regression;

calculate a final intensity contour for said utterance by applying said intensity modification factors to said original intensity contour; and generate a coherently-modified speech signal by time-dependent scaling of the intensity of said pitch-modified utterance according to said final intensity contour.

10. The computer program product of claim 9, wherein the received utterance is natural speech, and wherein the program code is further executable by said at least one hardware processor to map each of said frames to a corresponding speech class selected from a predefined set of speech classes.

11. The computer program product of claim 9, wherein each of said frames is mapped to a corresponding speech class selected from a predefined set of speech classes, and wherein the program code is further executable by said at least one hardware processor to set the values of said control parameters for each of said frames according to its corresponding speech class.

12. The computer program product of claim 11, wherein the program code is further executable by said at least one hardware processor to offline model the pitch to intensity relationship to receive said values for said control parameters according to said speech classes.

13. The computer program product of claim 9, wherein the intensity modification factor is ten in the power of the twentieth of the ratio of average empirical decibels per octave multiplied by the extent of pitch modification expressed in octaves.

14. The computer program product of claim 9, wherein the calculating of the intensity modification factor for each of said frames comprises:
    calculating a reference value of the intensity corresponding to an original pitch frequency of the original pitch contour for said each frame, by applying the pitch-to-intensity transformation to the original pitch frequency;
    calculating a reference value of the intensity corresponding to the target pitch frequency of the target pitch contour for each of said frames by applying the pitch-to-intensity transformation to the target pitch frequency; and
    dividing the reference value of the intensity corresponding to the target pitch frequency by the reference value of the intensity corresponding to the original pitch frequency.

15. A system comprising:
(i) a non-transitory storage device having stored thereon instructions for:
receiving an utterance embodied as digitized speech signal, an original pitch contour of the utterance, and a target pitch contour for the utterance, wherein the utterance comprises a plurality of consecutive frames, and wherein at least one of said frames is a voiced frame,
calculating the original intensity contour of said utterance,
generating a pitch-modified utterance based on the target pitch contour,
calculating an intensity modification factor for each of said frames, based on said original pitch contour and on said target pitch contour, to produce a sequence of intensity modification factors corresponding to said plurality of said consecutive frames,
wherein:
    the calculating of the intensity modification factor for each of said frames is further based on a pitch-to-intensity transformation modeling the relationship between the instantaneous pitch frequency and the instantaneous intensity of the utterance,
    the pitch-to-intensity transformation is represented as a function of a pitch frequency and a set of control parameters, and
    the pitch-to-intensity transformation is based on log-linear regression, and wherein the set of control parameters comprises the slope coefficient of the regression line of the log-linear regression,
calculating a final intensity contour for said utterance by applying said intensity modification factors to said original intensity contour, and
generating a coherently-modified speech signal by time-dependent scaling of the intensity of said pitch-modified utterance according to said final intensity contour; and
(ii) at least one hardware processor configured to execute said instructions.

16. The system of claim 15, further comprising a database, wherein:
    each of said frames is mapped to a corresponding speech class selected from a predefined set of speech classes,
    the database comprises values of said control parameters per a speech class of said set of speech classes,
    and wherein said storage device has further stored thereon instructions for setting values for said control parameters for each of said frames according to its corresponding speech class, wherein the values are fetched from said database.

* * * * *